United States Patent [19]

Konagaya et al.

[11] 4,440,016
[45] Apr. 3, 1984

[54] METHOD FOR HIGH SPEED LEAK TEST FOR METALLIC COVER WITH A PULL TAB

[75] Inventors: Takeshi Konagaya, Yaizu; Yukinao Yagi, Fujieda, both of Japan

[73] Assignee: Daiwa Can Company, Limited, Tokyo, Japan

[21] Appl. No.: 335,664

[22] Filed: Dec. 30, 1981

[30] Foreign Application Priority Data

Oct. 12, 1981 [JP] Japan ................. 56-162509

[51] Int. Cl.³ .......................................... G01M 3/04
[52] U.S. Cl. ........................................ 73/40; 73/45.2
[58] Field of Search .............. 73/40, 45.2, 46, 49.2, 73/49.8

[56] References Cited

U.S. PATENT DOCUMENTS 3,875,789  4/1975  Orosy ........................... 73/40
3,875,790  4/1975  Herdzina et al. ............. 73/40
3,954,003  5/1976  Dobbins ........................ 73/40

Primary Examiner—S. Clement Swisher
Assistant Examiner—Joseph W. Roskos
Attorney, Agent, or Firm—Wenderoth, Lind & Ponack

[57] ABSTRACT

A method for high speed leak test for a metallic cover with a pull tab. When one wants to test whether a metallic cover with an opening-defining score line and a pull tab for breaking off a part of the cover defined by the score line has a leak, the cover is put in a closed chamber. The closed chamber is divided into an upper closed portion in which the tab is present and a lower closed portion in which the tab is absent, thereby making the cover the boundary. Pressurized air is then injected into the upper closed portion to test whether the cover has a leak by measuring the change in the air pressure within the lower closed portion.

3 Claims, 4 Drawing Figures

METHOD FOR HIGH SPEED LEAK TEST FOR METALLIC COVER WITH A PULL TAB

BACKGROUND OF THE INVENTION

The present invention relates to a method for high speed testing of whether a metallic cover has a leak by the application of pressurized air, wherein said metallic cover has an opening-defining score line on the upper surface and a tab for breaking off a part of the cover defined by the score line and which is fixed to the upper surface side of the cover, and said cover further comprises a central plate portion, a countersink portion, a flange portion, and a curled portion positioned from the center of the cover to its periphery in the aforesaid order.

The above-mentioned type metallic cover is likely to suffer from breakage at the tab-fixing portion and along the score line when it is manufactured. Therefore, hitherto tests of whether such breakage is present or not have been widely performed in the can manufacturing industry by the utilization of pressurized air. The prior art method for the test comprises holding a metallic cover between the upper and lower parts facing each other to form a closed chamber which is divided into two closed portions wherein said metallic cover is the boundary, injecting pressurized air into the closed portion which faces to the tab-absent surface or the lower surface of the cover and to which the inner pressure is applied when the cover is seamed to a can, such as a beer can, containing a liquid which generates an inner pressure, and testing whether said metallic cover has a leak with a sensor which functions in response to the change in the pressure within the other closed portion which faces the tab-existing surface or the upper surface of the cover caused by the passage of the pressurized air into it through said leak and gives a signal warning that said metallic cover has a leak.

The main system of an example of a prior test machine employed in the above type method is shown in FIG. 1.

FIG. 1 is a sectional view of the main system for testing whether a metallic cover has a leak in the state where the metallic cover is inserted between the upper and lower parts in a closed chamber.

In this figure, A is the upper part and B is the lower part; the two parts construct a closed chamber.

The upper part A comprises a ring-like wall 1, a cylindrical wall 2 hanging down from the periphery of said ring-like wall 1 and a knockout part 3 which can move up and down through the center of said ring-like wall 1 and is always pushed downwardly by a spring 5 located upwards. Here, the lower portion 4 of said knockout part is exposed to space 6 surrounded by the above-noted cylindrical wall 2. Furthermore, there is provided a passage 7 in said knockout part 3 which communicates with a pipe 8 leading to a detector which detects the change in the air pressure (not shown) and is open to said space 6 on the other side. In order to form one closed chamber together with the lower part B, an outer elastic ring 10 is attached to the lower surface 9 of the above cylindrical wall 2, and an inner elastic ring 12 is provided near the periphery of the lower surface 11 of the ring-like wall 1 which contacts with the upper surface of the flange portion of the metallic cover so that said closed chamber is divided into two upper and lower closed portions when the metallic cover C is placed between the upper and the lower parts A and B.

The lower part B comprises a disc wall 21 and an annular projecting wall 23 which projects upwards from the periphery of the upper surface 22 of said disc wall 21 at position at which the lower part contacts the above inner elastic ring 12; the periphery of the disc wall 21 forms a ring portion 24 outside said annular projecting wall 23 to receive the outer elastic ring 10. In the center of said disc wall 21 there is provided a passage 25 which communicates with a pressurized air supply pipe 28 and is open in the upper surface 22 of the disc wall 21. Furthermore, the upper edge surface of the projecting wall 23 is provided with a staged notch 26 which receives the edge portion of the curled portion 33 (described later) of the cover C.

The metallic cover shown in FIG. 1 comprises a central plate portion 30, a countersink portion 31, a flange portion 32, the curled portion 33 and a pull tab 35 which is fixed to the upper surface side of said central plate portion 30 by a rivet 34 formed in the center of the central plate portion 30, and a score (not shown) defining an opening is coined in the central plate portion 30.

Hereunder, how the prior art for testing whether a cover has a leak is carried out in the thus formed closed chamber is described. First, the cover C is put on the lower part B by placing the curled portion 33 on the staged notch 26 of the annular projecting wall 23 of the lower part B. Then, the upper part A and the lower part B are positioned close to each other so that the annular projecting wall 23 of the lower part B comes in the inside of the cylindrical wall 2 of the upper part A, and the outer elastic ring 10 comes in contact with the ring portion 24 of the lower part B while the upper surface of the flange portion 32 of the metallic cover is contacted with the inner elastic ring 12 of the upper part A under pressure, thereby holding the metallic cover C between the upper part A and the lower part B.

That is, in the above system, the upper part and the lower part get positioned close to each other to contact the outer elastic ring 10 of the upper part with the ring portion 24 of the lower part under pressure, thereby forming the closed chamber and positioning the peripheral portion (the flange portion and the curled portion) of the metallic cover between the inner elastic ring 12 and the staged notch 26 in the upper edge of the annular projecting wall 23 of the lower part under pressure to divide the closed chamber into an upper closed portion 36 and a lower closed portion 37 making the metallic cover C the boundary (FIG. 1). Either of the two closed portions 36 and 37 has a considerable large space around the central plate portion of the metallic cover.

After the cover is put into the state as shown in FIG. 1, pressurized air is supplied to the inside of the lower closed portion 37 through the pressurized air supply pipe 28 and the passage 25. Thus, if the metallic cover has a leak portion such as a pinhole or a crack along the score line, the pressurized air in the lower closed portion 37 flows into the upper closed portion 36 through said leak portion resulting in the change in the air pressure within said upper closed portion 36, and said change is detected with a detector via the passage 7 and the pipe 8 of the knockout part to generate a signal.

In case the metallic cover has no leak portion anywhere, the air pressure within the upper closed portion 36 does not change, and thus the detector does not generate a signal.

In connection with the above, the knockout part 3 mentioned above is to prevent the tested cover from being left in the upper part and to keep it in the original position on the lower part when the upper and the lower parts are suddenly separated from each other. That is, when the upper part moves up, the knockout part 3 moves down to hold back the cover so that it does not lift together with the upper part.

Thus, in a method where pressurized air is injected into one of the two closed portions formed by the division of the closed chamber making the metallic cover the boundary, wherein the determination of whether the cover has a leak portion is tested by the change in the air pressure within the other closed portion because of the passage of the pressurized air thereinto through the leak portion if the metallic cover has a leak portion such as a crack or a pinhole, it is desirable to improve the detection capacity of the detector to such an extent that it can detect a very small change in air pressure in order to shorten the test time or to effect the test at a high speed. Alternatively, air at a higher pressure is injected. In this case, the detection ability of the test machine may be the same level as of the prior art one. That is, when the size of the leak portion is the same, it is expected that the higher the pressure of the air injected is, the shorter the time may become which is necessary for the air to flow in such an increased amount that the detector can detect its flow into the other closed portion. This means that the air pressure within "the other closed portion" is increased more speedily, and thus the air pressure attains the minimum level which the detector can detect (this level is definite) more speedily, thereby shortening the test time. In this connection, however, it is noted that the countersink portion of the cover may be deformed or buckled by the application of the increased pressurized air to the central portion because the periphery of the cover is fixed.

Now, having the above-mentioned expectation, the inventors of the present invention tried some experiments using the prior art system referred to above.

As a result, it was found that covers may be tested at a rate speed of about 300 pieces/min. in case the pressure of the air injected is 0.7 kg/cm$^2$ and that the detectable minimum diameter of the leak aperture is about 3/1000 inches. Here, no occurrence of deformed covers was found.

Then, the air pressure was gradually increased, but the test speed did not increase correspondingly while the occurrence of deformed covers was noted.

For example, when the air pressure was set at 3 kg/cm$^2$, the treatment rate attained about 350 pieces/min., but some of the covers were deformed to such an extent that they could not be used. That is, it was found that, as the central plate portion was moved upwards by the application of the pressurized air thereby deforming the countersink portion, as a means to prevent this, the knockout part was utilized to contact and push down the cover, but, what is directly received by the knockout part is the pull tab, and, as there is a gap of a size corresponding to the thickness of said tab between the central plate portion which cannot be received directly by the knockout portion and the latter, a recess in the form corresponding to that of the tab is produced in the central plate portion thereby producing a negative result in that said deformation causes breakage of a part of the score line or weakens the line even if the line is not broken.

From this fact, we, the inventors of the present invention, knew that there is a limit to the shortening of the test time by the application of air injected at an increased pressure with the prior art system, and thus a satisfactory result cannot be expected by the application of the prior art. Instead, we have studied other ways to produce a satisfactory result. As a result, we have attained the present invention.

SUMMARY OF THE INVENTION

The present invention is directed to a method of testing whether a metallic cover has leak portions by the utilization of pressurized air which is improved in that the test is made at a high speed and in that the cover is not deformed, and is further directed to a system used for this method.

According to the present invention, there is provided a method for high speed leak test for a metallic cover with a pull tab characterized by holding a metallic cover having a central plate portion, a countersink portion, a flange portion and a curled portion which are arranged from the center to the periphery in the aforesaid order, where an opening-defining score line is coined in said central plate portion and a pull tab is fixed to the upper surface side of said central plate portion, between facing upper and lower parts which construct one closed chamber cooperatively, with a very small gap between the lower surface of the central plate portion, the countersink portion and the flange portion of said metallic cover and said lower part to divide said closed chamber into an upper closed portion in which said pull tab is present and a lower closed portion in which said tab is absent making said metallic cover the boundary; injecting pressurized air into said upper closed portion; and detecting the change in the air pressure within said lower closed portion to determine if the metallic cover has a leak portion.

According to the present invention, there is further provided a system for testing a leak of a metallic cover provided with a central plate portion, a countersink portion, a flange portion and a curled portion which are arranged from the center to the periphery in the aforesaid order, where an opening-defining score line is coined in said central plate portion and a pull tab is fixed to the upper surface side of said central plate portion, characterized by comprising the following construction:

the system is provided with facing movable upper and fixed lower parts which construct one closed chamber cooperatively; said upper part is provided with a perforation, one end of which is open in the upper closed portion in said closed chamber mentioned below, and the other end of which connects with a pressurized air supply machine; said lower part is provided with an annular projecting portion supporting the curled portion of said metallic cover which is placed with the side to which said pull tab is fixed upward, a central wall having a top surface being in close vicinity to the whole lower surface of the central plate portion of said supported cover, and one perforation, one end of which is open in the top surface of said central wall, and the other end of which connects with a pipe leading to a detector for detecting the change in air pressure; said closed chamber is formed by placing the curled portion of said cover, with the side to which said tab is fixed upward, on the annular projecting portion of said lower part and then holding said cover between said upper and lower parts; the upper surface of said flange portion of the cover is forced by pressure to come in contact with the annular inner elastic material attached to said upper part, thereby dividing said closed chamber into the upper closed portion and the lower closed portion; and air at a high pressure is injected into said upper closed portion through the perforation of said upper part to test whether said metallic cover has a leak portion, said test determination made by measuring the presence or the absence of a change in the air pressure within said lower closed portion.

DETAILED EXPLANATION OF THE PREFERRED EMBODIMENTS OF THE INVENTION

According to the method of the present invention, even if pressurized air is injected into the closed portion in which the tab which is affixed to the metallic cover is present so as to press down the metallic cover, only the very small gap which is provided when the metallic cover is held between the upper and the lower parts is present between said metallic cover and the lower part, so the deformation of the central plate portion of the cover is slight, if any, even if the pressure of the air injected is increased, as the central plate portion partially contacts the lower part (the central plate portion has many shallow jogs or indentations formed during the coining of the score line, the fixing of the tab, and the shaping of the cover, so that some of such jogs are in contact with the lower portion), the deformation cannot go over this limitation, and the central plate portion can be readily restored to the original state if the injection of pressurized air is stopped, and thus there is no possibility that the central plate portion suffers from permanent deformation. Therefore, according to the present invention, air at a pressure which cannot be applied by the prior art method and system may be used, and thus the test may be made at a high speed.

Figure 1:
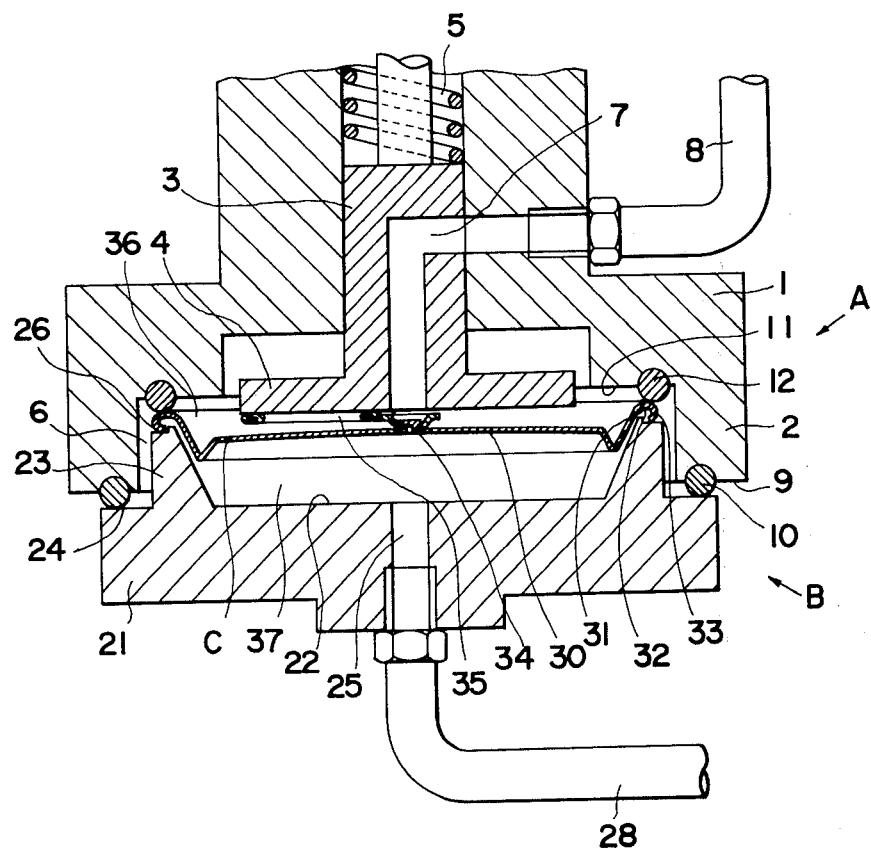
FIG. 1 is a sectional view of the main portion of the system employed when the prior art method is carried out showing the state where the metallic cover is held in the proper place.

Furthermore, according to the method of the present invention where the change in the air pressure is detected within the lower closed portion formed when the metallic cover is held between the upper and the lower parts so as to determine whether the cover has a leak, the lower closed portion is concretely constructed so as to have the above-noted very small gap and to have a pipe which communicates with said gap and leads to the detector. Accordingly, as compared to the case where the system as shown in FIG. 1 is utilized—that is, the prior art system having a rather big gap present between the metallic cover and the lower part so as to create a large space therebetween, the volume of the closed portion of the system in accordance with the present invention is relatively small. Also this smaller volume further contributes to the leak detection at a higher speed.

In addition, if the holding of the metallic cover is effected by using an elastic material provided at a part of the upper part and arranged so as to be contacting the upper surface of the flange portion of the metallic cover and if another elastic material is provided at a part of the lower part and arranged so as to be contacting the lower surface of the periphery of the central plate portion in order to form the upper and lower closed portions, and if the lower closed portion is designed to be constructed of a closed zone facing the central plate portion of the metallic cover and another closed zone facing the peripheral portion of the metallic cover including the countersink portion, the flange portion and the curled portion, such that the leak of air is detected in the respective zones, separately, then the leak portions can be detected at a higher speed.

Furthermore, in case the metallic cover is held in such a manner as that noted above, it cannot be in the state where the edge line of the curled portion of the cover is placed on the lower part as was explained with reference to FIG. 1. Therefore, according to the prior art holding method as shown in FIG. 1, when the pressure of the pressurized air is increased, there is a possibility that the edge line of the curled portion contacting with the lower portion may be crushed and suffer from permanent deformation if the contact pressure between the inner elastic rings and the flange portion of the metallic cover is increased in response to the increase in said pressure in order to maintain the tightness of the upper and the lower closed portions. However, as mentioned above, the curled portion of the cover becomes free from the possibility of crushing because the cover is held in such a manner that the peripheral portion of the central plate portion contacts said another elastic material and the curled portion does not contact the lower portion.

EXAMPLE 1

A simple example of the present invention will be explained with reference to FIG. 2.

Figure 2:
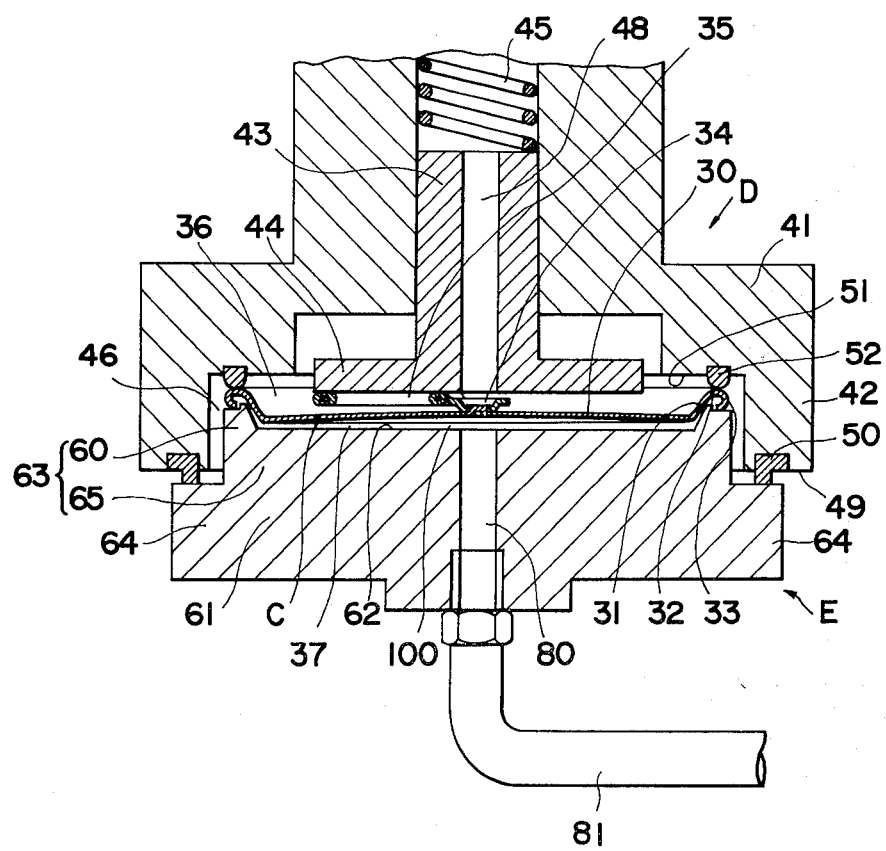
FIG. 2 is a sectional view of the main portion of the system employed when an embodiment of the method of the present invention is carried out showing the state where the metallic cover is held in the proper place.

FIG. 2 is, as is FIG. 1, a sectional view showing the state where a metallic cover is held between an upper part and a lower part so as to construct upper and lower closed portions. In FIG. 2, D is the upper part, and E is the lower part; they construct one closed chamber cooperatively.

The upper part D comprises a ring-like wall 41, a cylindrical wall 42 hanging down from the periphery of said ring-like wall 41 and a knockout part 43 which is through the central portion of said wall 41, movable up and down, and always pressed down by a spring 45 located upward. The lower portion 44 of said knockout part is exposed to a space 46 surrounded by said cylindrical wall 42. In turn, a passage 48 which is open to said space 46 is provided in the central portion of said knockout part 43, and the passage 48 is connected to a pressurized air supply machine (not shown).

In order to form a closed chamber together with the lower part E, the upper part D is provided with an outer elastic ring 50 on the lower surface of the cylindrical wall 42 and an inner elastic ring 52 for the holding of the metallic cover C is provided near the periphery of the lower surface 51 of the ring-like wall 41 and at a position at which the ring 50 faces the annular wall 60 of the lower part E mentioned below.

The lower part E has a disc wall 61, and an upwardly raised part 63 which constitutes the remainder of said disc wall 61 other than its peripheral portion 64 facing the hangingdown cylindrical wall 42 of the upper part. Said raised portion 63 has almost the same outer diameter as the metallic cover to be tested and is the portion which is covered by said held metallic cover. Said raised portion 63 is formed of an annular wall 60 which is located at a position corresponding to the countersink portion 31, the flange portion 32 and the curled portion 33 of the metallic cover C and a central wall 65 located at a position corresponding to the central plate portion 30 of the metallic cover. Here, 34 is a rivet, and 35 is a pull tab fixed to the upper surface side of the central plate portion. The upper surface 62 of the central wall 65 takes almost the same form as the lower surface of the central plate portion of the metallic cover. Thus, a very small gap 100 is designed to be formed between the respective lower surfaces of the central plate portion 30, the countersink portion 31 and the flange portion 32 of the cover and said annular wall 60 and the central wall 65 when the cover C is held in the upper and the lower parts. In this example, said gap was designed to be 0.1 mm.

Furthermore, 80 is a passage which is open in the upper surface of the central wall 65 and communicates with the said gap 100. The other end of this passage is designed to connect to a pipe 81 leading to a detector for detecting the change in air pressure (not shown).

Now, as first the upper and the lower parts are positioned far from each other, the cover C is placed on the lower part E by first locating the curled portion 33 of the cover C on the annular wall 60 of the lower part. Then, the upper and the lower parts are made come close to each other so that the inner elastic ring 52 of the upper part comes in contact with and engaged with the upper surface of the flange portion of the cover to hold the cover C between the ring 52 and the annular wall 60. Here, as the edge line of the curled portion 33 of the cover being in contact with the annular wall 60 of the lower part is not always a completely even plate, and the edge line has very small jogs, so gaps due to said jogs are formed between said edge line and the annular wall 60. At the same time, the outer elastic ring 50 comes in contact with the upper surface of the peripheral portion 64 of the lower part to form one closed chamber. This closed chamber is in turn divided into the upper closed portion 36 in which the pull tab is present and the lower closed portion 37 located beneath the lower surface of the cover C in which said pull tab is absent. This divided state is shown in FIG. 2.

After the above state was brought about, pressurized air was injected into the upper closed portion 36 through the perforation 48. The central plate portion of the metallic cover was pressed to the lower part by this air pressure, but only slight deformation of the portion was found because the shallow jogs formed in the central plate portion were received by the central wall 65 of the lower part. That is, in this example, when the pressurized air was employed at about 5 kg/cm², the cover was readily restored to the original form after the stop of the injection, and no significant permanent deformation was noted.

Thus, the space portions present between the lower surface of the cover and the lower part, namely, the very small gaps, are very small as compared with those present between the cover C and the lower part according to the prior art, so in case the cover C has a leak through which the injected pressurized air has leaked, the detection of the change in the air pressure within the lower closed portion because of the leakage may be made more rapidly according to the system of the present invention than to the prior art system. In this example, an experiment was effected using pressurized air at about 5 kg/cm² such that the number of the covers tested was 450/min., and the diameter of the minimum pinhole detected at this test speed was 0.050 mm (2/1000 inches).

In view of the fact that such high air pressure cannot be applied in any way by the prior art system, the advantage of the system of the present invention will be apparent.

EXAMPLE 2

Another example of the method of the present invention is explained with reference to FIGS. 3 and 4.

Figure 3:
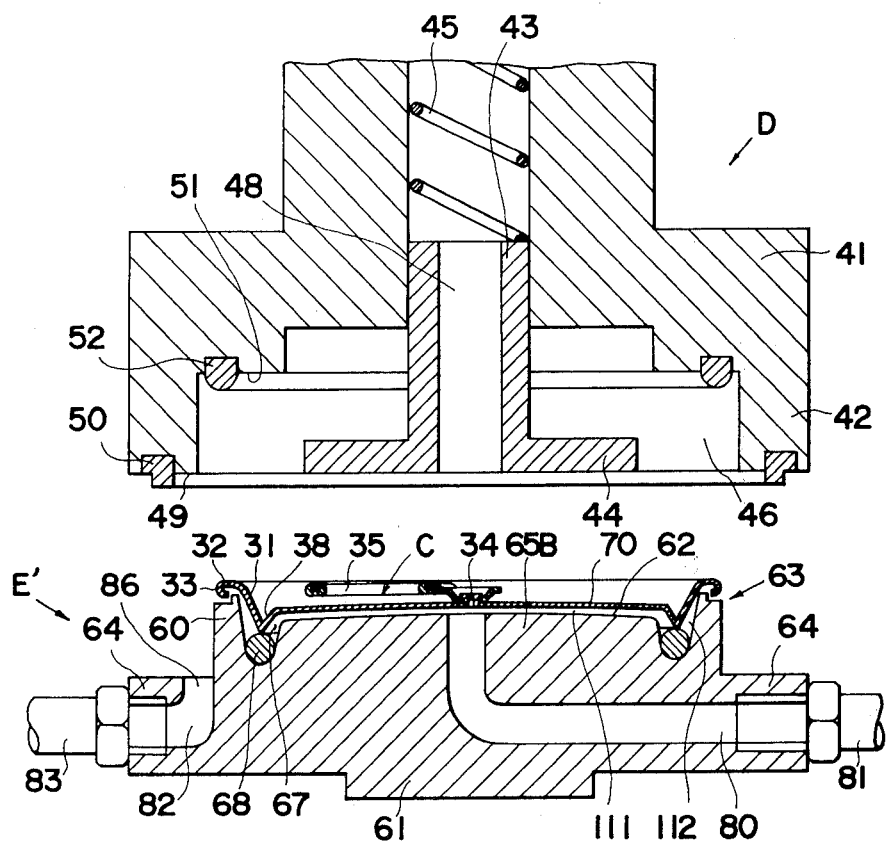
FIG. 3 is a sectional view of the main portion of the system employed when another embodiment of the method of the present invention is carried out showing the state before the metallic cover is held in the proper place.
Figure 4:
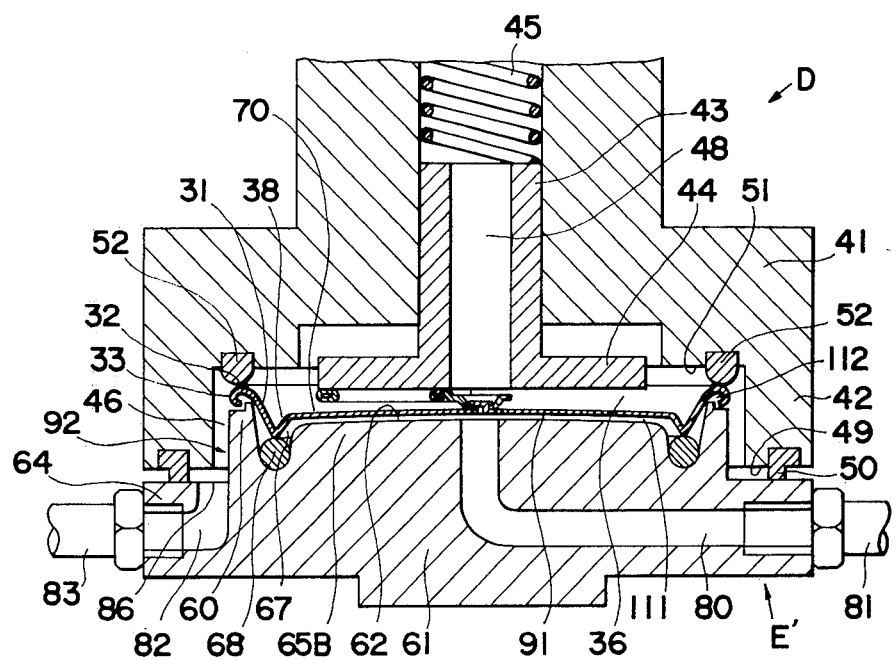
FIG. 4 is the same sectional view as FIG. 3, but showing the state where the metallic cover is held in the proper place.

FIG. 3 is a sectional view of the system used when the method of the present invention is carried out and showing the state where a metallic cover is placed on the lower part, and the upper part is located upward away from the lower part, and FIG. 4 is a sectional view which is similar as that of FIG. 3, but showing the state where the upper part and the lower part contact with each other to hold the metallic cover therebetween.

Here, the upper part D is the same as that shown in FIG. 2, so its explanation is omitted. The lower part E' is the same as the lower part E shown in FIG. 2 in that it is provided with a disc wall 61, a raised portion 63, a peripheral portion 64 and a passage 80, but is different from the latter in some points. That is, said raised portion 63 is formed of an annular wall 60 located at a position corresponding to the countersink portion 31, the flange portion 32 and the curled portion 33 of the metallic cover C, a central wall 65B located at a position corresponding to the center part 70 of the central portion of the metallic cover, and an annular groove 67 provided between said central wall 65B and said annular wall 60 and used for the insertion of a lower elastic ring 68 contacting with the lower surface of the peripheral part of the central plate portion of the cover. In the figure, said annular goove 67 is located at a position corresponding to the peripheral portion 38 of the central plate portion which is shown as the downward bead. The upper surface 62 of the central wall 65B takes almost the same plate form as the surface of the center part 70 of the metallic cover.

Thus, the system is so designed so that when the cover C is held between the upper and the lower parts, the closed chamber is divided into the upper and the lower closed portions, and furthermore, the lower closed portion is divided into the closed zone facing the central plate portion of the metallic cover and the other closed zone facing the peripheral portion of the metallic cover; a very small gap 111 is present between the lower surface of the central portion of the metallic cover and the lower part in the former closed zone and, in the latter closed zone, a very small gap 112 is present between the lower surface of the peripheral portion—that is, the respective lower surfaces of the countersink portion, the flange portion and the curled portion and the lower part (to be described later). In this example, the very small gaps are constructed so as to be 0.3 mm or less in consideration of the variations in the dimensions of the covers produced on a large scale. Here, 80 is a passage as is shown in FIG. 2, but is L-shaped. 81 is a pipe connecting said passage 80 to a detector for the detection of the change in the air pressure within the closed zone facing the central plate portion (not shown). In turn, 82 is an L-shaped passage one end of which has an opening 86 in the upper surface of the peripheral portion 64 of the disc wall 61 and the other end of which connects with a pipe 83 fixed to the side of the disc wall 61 (the other end of said pipe 83 communicates with a detector for the detection of the change in the air pressure within the closed zone facing the peripheral portion of the metallic cover (not shown)); the opening 86 in the upper surface is provided at a position where the opening is inward of the outer elastic ring 50 of the upper part and is not choked by said ring 50 when the upper part engages with the lower part.

The upper part D and the lower part E' come closer to each other (FIG. 3), and a little later the outer elastic ring 50 of the upper part comes in contact with the upper surface of the peripheral portion 64 of the disc wall 61 of the lower part to form the closed chamber in such a manner that, in connection with the relationship with the opening 86 of the perforation 82, the contact under pressure is made outward of said opening (FIG. 4). Here, the inner elastic ring 52 of the upper part contacts the flange portion 32 of the metallic cover under pressure to form the upper closed portion 36 between the portion of the metallic cover being inward of said pressure contact line and the upper part, and at the same time the lower elastic ring 68 and the peripheral portion 38 of the central plate portion of the metallic cover contact each other under pressure to form the closed zone 91 facing the central plate portion between the portion of the metallic cover being inward of said pressure contact line and the central wall 65B of the lower part. Furthermore, outward of said pressure contact line, another closed zone 92 facing the peripheral portion of the cover is formed which involves the space portion 46 connecting the very small gap 112 and the passage 82 (this space portion is found also in FIGS. 2 and 3, and thus is not peculiar to this example).

In the state as shown in FIG. 4, pressurized air is supplied to the upper closed portion 36 by the injection through the passage 48 of the knockout part 43. In this example, 5 kg/cm² of pressurized air was injected, but no permanent deformation of the cover was found. Here, the metallic cover is pressed to the lower part by said air pressure, and correspondingly, the contact between the lower elastic ring 68 and the peripheral portion 38 of the central plate portion of the metallic cover becomes more intimate to assure the closedness of the closed zone 91 more rigidly. Thus, when said central plate portion has a leak portion, the pressurized air flows into said closed zone 91 through said leak. Since the volume of said closed zone 91 is smaller than that of the lower closed portion 37 shown in FIG. 2, even if the amount of the air which flows thereinto is small, the air pressure within said closed zone increases more rapidly, and this increase may be detected immediately with the detector through the passage comprising the passage 80 and the pipe 81. Furthermore, if the leak is in the peripheral portion of the cover, the pressurized air flows into the space portion 46 through said leak portion and via the gap 112, the change in the air pressure caused by the air flow is detected by the detector through the passage 82 and the pipe 83. The volume of this space portion 46 is larger than that of the very small gap 111, but the change in the air pressure due to the leakage of the air is brought about more speedily than in the case where the lower elastic ring 68 is not used and said gaps 111 and 112 and said space portion 46 are connected to each other.

In this example, 5 kg/cm² of pressurized air was supplied to test whether a leak exists. The number of covers treated was 450/min., and, at this test speed, all the covers having a leak pinhole of a diameter of at least 0.005 mm (2/10000 inches) in the central plate portion were detected and also, all the covers having a leak pinhole of a diameter of at least 0.025 mm (1/1000 inches) in the peripheral portion were detected.

The above result means that, as compared with the performance of the method using the prior art system shown in FIG. 1, the test speed was increased by 50%, and the detection accuracy was improved by 15 times in the central plate portion and by 3 times in the peripheral portion. Here, in this second example, the lower elastic ring receives the peripheral portion of the central plate portion of the metallic cover, so that the curled portion of the cover is not pressed to the lower part to such an extent that it suffers from permanent deformation even when air at a high pressure of 5 kg/cm² is employed. Thus, there is provided an additional advantage in that the form of the curled portion is not damaged.

Preferred examples of the present invention were shown in the foregoing. The practice of the embodiments as shown in FIGS. 3 and 4, except for the use of the lower elastic ring 68, is also within the scope of the present invention. That is, even in such a case, as the central wall of the lower part acts against the deformation of the central plate portion of the metallic cover due to the injection of pressurized air into the upper closed portion, air at an extremely high pressure may be used as compared with the case of the prior art method, that is, the method where pressurized air is injected into the closed portion in which the tab is absent (the lower closed portion), and thus the test ability may be enlarged.

We claim:

1. A method for performing a high speed leak test for a metallic cover with a pull tab characterized by holding a metallic cover having a central plate portion, a countersink portion, a flange portion and a curled portion which are arranged from the center to the periphery in said order, where an opening-defining score line is coined in said central plate portion and a pull tab is fixed to the upper surface side of said central plate portion, between facing upper and lower parts which define one closed chamber cooperatively, with a very small gap between the lower surface of the central plate portion, the countersink portion and the flange portion of said metallic cover and said lower part dividing said closed chamber into an upper closed portion in which said pull tab is present and a lower closed portion in which said tab is absent making said metallic cover the boundary; comprising the steps of:

injecting pressurized air into said upper closed portion; and detecting the change in the air pressure within said lower closed portion so as to determine whether the metallic cover has a leak;

wherein said metallic cover is held between an elastic material attached to said upper part and contacting with the upper surface of the flange portion of the metallic cover and another elastic material attached to said lower part and contacting with the lower surface of the periphery of the central plate portion of the metallic cover to define the upper and the lower closed portions and, said lower closed portion is divided into a closed zone facing the central plate portion of the metallic cover and another closed zone facing the peripheral portion of the metallic cover wherein, in said closed zone facing the central plate portion, the change in the air pressure is detected within the very small gap between the lower surface of said central plate portion and said lower part and within a passage which communicates with said very small gap and leads to a detector, while, in the closed zone facing said peripheral portion, the change in the air pressure is detected within the very small gap between the lower surface of the peripheral portion of the cover comprising said countersink portion, flange portion and curled portion and said lower part and within a passage which communicates with said very small gap and leads to a detector.

2. A method as described in claim 1, wherein the pressurized air is injected at a rate of at least 3 kg/cm$^2$.

3. A method as described in claim 1, wherein said very small gap is less than or equal to 0.3 mm in size.

* * * * *